United States Patent [19]

Hubbard

[11] 4,307,410
[45] Dec. 22, 1981

[54] DISPOSABLE INSTRUMENT PEN WITH INTEGRAL SPRING MEMBER

[75] Inventor: James R. Hubbard, Moorestown, N.J.

[73] Assignee: Graphic Controls Corporation, Cherry Hill, N.J.

[21] Appl. No.: 92,451

[22] Filed: Nov. 8, 1979

Related U.S. Application Data

[62] Division of Ser. No. 913,320, Jun. 7, 1978, Pat. No. 4,233,609.

[51] Int. Cl.³ ............................................ G01D 15/16
[52] U.S. Cl. .............................. 346/140 A; 346/139 C
[58] Field of Search ........... 346/140 A, 140 R, 139 C, 346/139 R

[56] References Cited

U.S. PATENT DOCUMENTS

| 2,973,237 | 2/1961 | Whiteley | 346/140 A X |
| 3,373,442 | 3/1968 | Belanich | 346/140 A X |
| 3,435,459 | 3/1969 | De Nicola | 346/140 |
| 3,824,603 | 7/1974 | Bates | 346/140 A X |
| 4,023,186 | 5/1977 | Tallerico | 346/140 A |

Primary Examiner—Joseph W. Hartary
Attorney, Agent, or Firm—Paul F. Prestia

[57] ABSTRACT

Disposable instrument pen with integrally-formed spring member simplifies installation and provides its own biasing means for urging the pen nib into engagement with a writing surface and/or for retaining the pen in a pen mounting carriage. In various alternative embodiments, the spring member may consist of a cantilever arm, a torsion bar with end mount fixtures, a helical spring, flared wings, etc.

9 Claims, 13 Drawing Figures

DISPOSABLE INSTRUMENT PEN WITH INTEGRAL SPRING MEMBER

This is a division of application Ser. No. 913,320 filed June 7, 1978, now U.S. Pat. No. 4,233,609.

This invention pertains to disposable instrument pens and more particularly to disposable instrument marker pens designed for simplified installation.

Instrument pens are pens adapted to be mounted in pen carriages in recording instruments. For reasons of cost and convenience of operation and maintenance of instruments including such pens, disposable instrument pens have come into rather common usage in the past few years. Such pens include their own ink supply. When the ink supply is depleted, the pen is simply replaced. Commonly, these disposable pens include fibrous body reservoirs and porous nibs or writing tips. Pens including such reservoirs and writing tips are sometimes referred to as markers or marker pens.

Typically, disposable instrument pens are retained in a pen carriage which includes an adjustable retainer of some kind or one or more spring members adapted to engage the pen body. Typically also, the carriage includes a biasing means for urging the writing tip of the pen into engagement with a writing surface. A pen holder including spring members for retaining a disposable instrument pen may be seen in U.S. Pat. No. 4,023,186-Tallerico of common assignment herewith. When a pen is replaced in such systems, it is sometimes difficult to avoid mislocating the pen in the pen carriage or so deforming the spring members of the carriage in the course of pen installation, as to cause pen misalignment or otherwise adversely affect pen position in the carriage so as to result in miscalibration of the instrument.

With the present invention, disposable pen replacement with surer avoidance of such difficulties is facilitated by the provision of a disposable pen with integrally formed spring members. Thus the necessity for spring members in the mounting carriage to secure and position and/or urge the pen into engagement with the writing surface is avoided.

While disposable instrument pens including such features are considered new (and not suggested by anything in the prior art), the provision of spring means in non-disposable instrument pens (i.e. instrument pens which do not include their own ink reservoir and which are not adapted for one time use and disposal) have been known to include spring means, as part of the pen design, which spring means are adapted to provide functional characteristics similar to those in the present invention.

For example, U.S. Pat. No. 3,348,235-Kawase et al discloses a cantilever resilient support member 12 attached to a pen to provide pen biasing and a similar effect is provided in U.S. Pat. No. 3,311,920-Thompson by a stiff webbed pen support member 15 urged downwardly by a set screw 40. A similar function is performed in the instrument pen designs of U.S. Pat. No. 3,229,699-Kuty by coil spring 16' and in U.S. Pat. No. 3,090,357-Gauley by a biasing portion 18 urging tube 14 downwardly.

In the patents referred to above, it can be seen that the mounting of instrument pens or the pens themselves usually include spring or elastic members which in general add to the complexity of the instrument, complicate the functions of pen mounting and maintenance and are inherently costly.

Having these problems in mind, the general object of the present invention is to provide a simplified instrument pen design which can be mounted and secured with a minimum of difficulty, and which provides its own biasing means for retaining the pen in the pen carriage and/or for urging the pen into engagement with the writing surface. More specifically, it is an object of the present invention to provide disposable instrument marker pens with mounting features which avoid some of the complexity attendant prior art pens and pen carriage designs.

These objects and others which will be apparent in the course of subsequent description of this invention are met, briefly, by disposable instrument pens, preferably marker pens, which include integrally formed elastic members adapted to maintain the pen in a fixed or relatively fixed position relative to the pen mounting carriage and/or a writing surface traversed by the carriage.

In view of the early stage of this development, no single embodiment of the invention is yet preferred but all embodiments devised to date are described specifically below.

For better understanding of this invention, reference may be made to the appended claims and detailed description of the various embodiments of the invention which follow, taken in conjunction with the drawings, in which:

Figure 1:
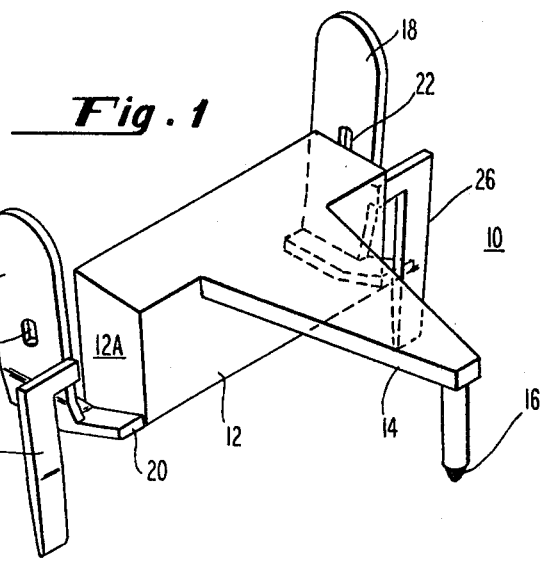
FIG. 1 is a perspective view of a disposable instrument marker pen having integrally formed elastic members for securing the pen in a carriage and for urging the pen against a writing surface.

Turning more specifically to FIG. 1, there is shown a disposable instrument marker pen 10 including a main body portion 12 and extended nib support portion 14 and downwardly disposed nib 16. Integrally formed with the sidewalls 12a of body portion 12 of pen 10, and disposed on either side thereof, are integrally formed elastic planar or wing members 18, attached to but spaced from sidewall 12a by an inwardly turned segment 20. Wing members 18, in relaxed non-mounted condition, extend slightly away from sidewalls 12a (or at least non-perpendicularly thereto). Further, wing members 18 include latch holes 22.

Figure 2:
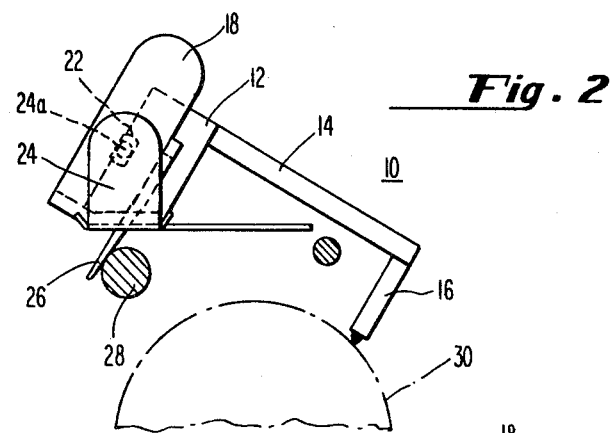
FIG. 2 is a side view of the pen shown in FIG. 1.
Figure 3:
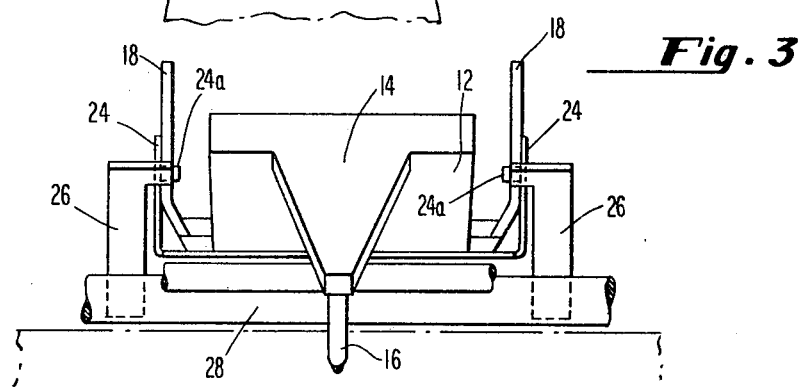
FIG. 3 is a front view of the pen shown in FIGS. 1 and 2.

As better seen in FIGS. 2 and 3 wing members 18 are urged slightly inwardly for mounting pen 10 in mating carriage members 24, the elasticity of wing members 18 acting to secure pen 10 in mounting members 24. In addition, mounting members 24 include an inwardly extending latch pin 24a which in the mounted arrangement of this assembly, extends through latch holes 22. Thus, pen 10 is secured in position within the carriage members 24. No adjustment or manipulation of mounting members 24 is required in removing or replacing pen 10 in the mounting members 24 and misalignment or miscalibration of the instrument by virtue of such manipulation is thus avoided.

Pen 10 also includes a second pair of integrally formed elastic members, namely pressure tabs 26 extending downwardly from wing members 18. Like wing members 18, pressure tabs 26 are also formed of an elastic or leaf spring type of material, most commonly a plastic such as polypropylene molded as part of the pen body. Pressure tabs 26 are adapted to be urged backwardly by shaft member 28, upon which the pen carriage traverses laterally in the course of instrument reading. The elasticity of pressure tabs 26 exerts a torque force on pen 10 about pivot pin 24a thus urging nib 16 into engagement with writing surface 30, all as best seen in FIG. 2.

Figure 4:
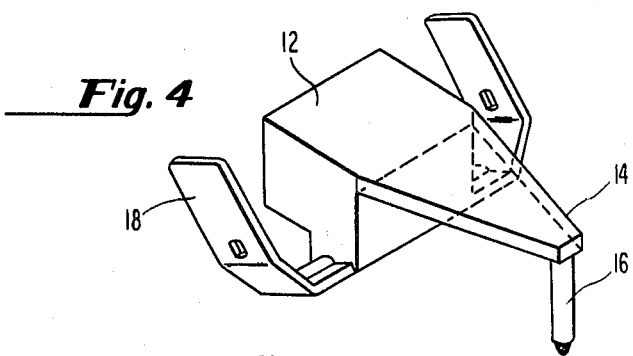
FIG. 4 is a perspective view of a disposable instrument marker pen, similar to that shown in FIG. 1 but omitting one set of elastic members therefrom.

FIG. 4 depicts another embodiment of the present invention, similar to that shown in FIGS. 1-3, with like numeral identifying like components, but differing by the omission of pressure tabs 26.

Figure 5:
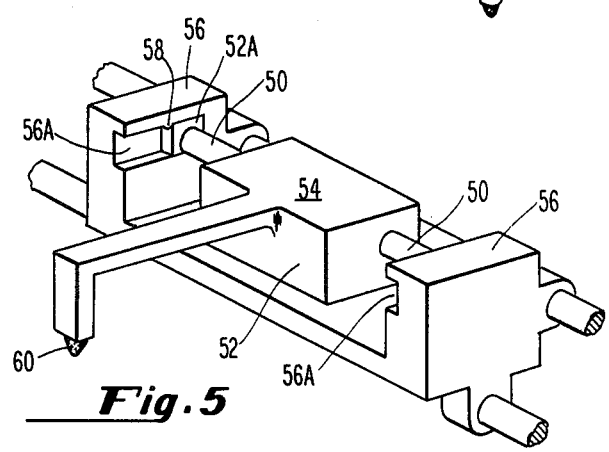
FIG. 5 is a perspective view of a disposable instrument marker pen, having torsion bar elastic members, and a mounting carriage therefor.
Figure 6:
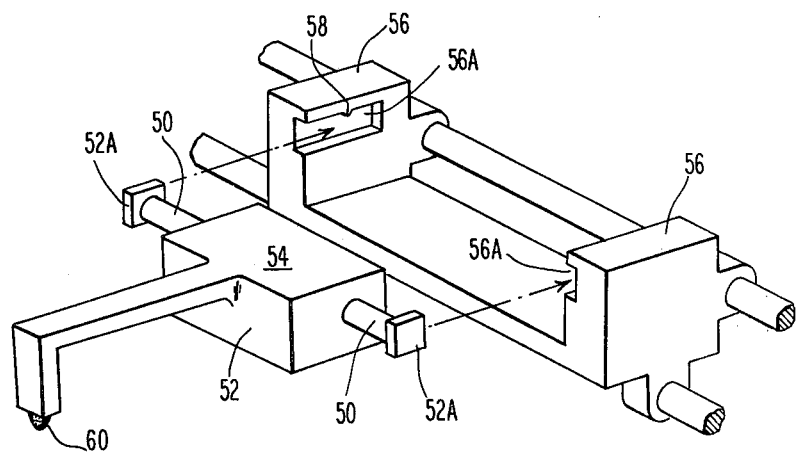
FIG. 6 is an exploded view of the pen and carriage shown in FIG. 5.

In the embodiment of the invention shown in FIGS. 5 and 6, torsion bars 50 extend outwardly from the sides of the main body portion 52 of a disposable instrument marker pen 54. Disposed at the distal ends (i.e. the ends away from the pen body) of torsion bars 50 are flat sided geometrical shapes or keys 52A adapted to slide into and to be prevented from twisting by slots 56A in pen carriage 56. To further secure pen 54 in pen carriage 56 detents 58 in slots 56A permit locking of keys 52 to prevent sliding movement of the pen once it is in its seated position. With nib 60 pressing against a writing surface adjacent to pen 54 and pen carriage 56, a twisting or torsional stress in torsion bars 50 is produced and the elasticity of torsion bars 50, tending to return pen 54 to its relaxed position, creates a downward biasing of nib 60 against the writing surface.

Figure 7:
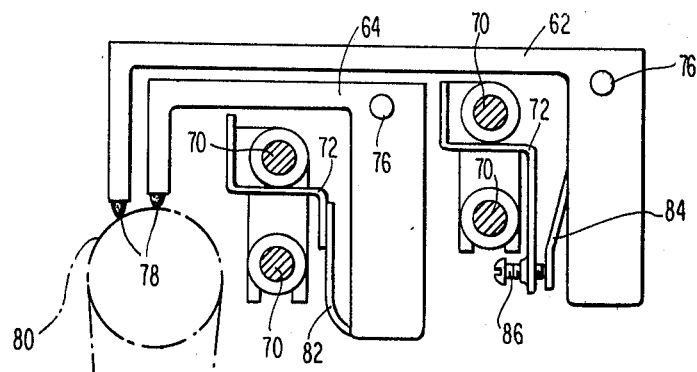
FIG. 7 is a side view of a pair of disposable instrument marker pens showing their assembled relation to certain components of the pen carriage.
Figure 8:
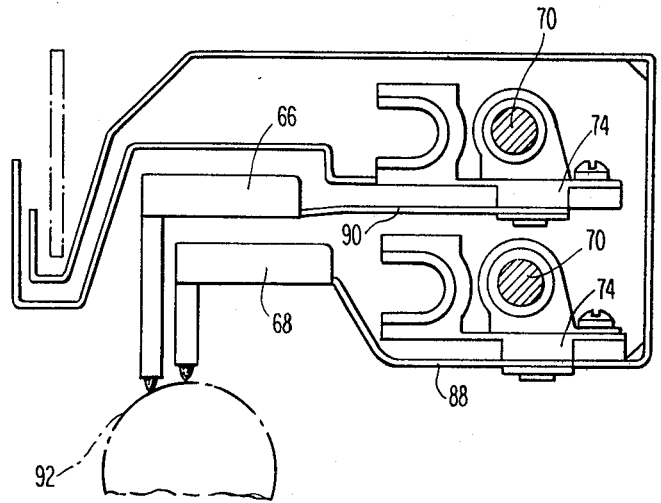
FIG. 8 is another side assembled view of a pair of disposable instrument marker pens.

In both FIGS. 7 and 8 there is shown an assembly of paired disposable instrument marker pens 62, 64 and 66 68 respectively. In both of these assemblies the pen mounting carriage includes shafts 70 upon which a pen carriage, a component of which 72 and 74, respectively, is shown.

Pens 62 and 64, of FIG. 7, include pivot point 76 adapted to mate within pivotal locating positions in a part of the pen carriage not shown and pens 62 and 64 are urged rotationally about pivot point 76, such that nibs 78 are urged into engagement with writing surface 80 by integrally formed spring or elastic members 82 and 84 associated with pen 64 and 62. The pressure of elastic members 82 and 84 pressing against carriage components 72 causes elastic stress in elastic members 82 and 84 in turn urging pen 62 and 64 about pivot member 76. A further feature of the mounting being shown in FIG. 7 and particularly in conjunction with the mounting of pen 62 is an adjustment screw 86, by which the biasing force may be adjusted. As will be evident, turning screw 86 inwardly so as to bear further against spring member 84 will produce more pressure. Backing screw 86 out will produce less biasing pressure.

In contrast to the pivotally mounted pen 62 and 64 in FIG. 7, pen 66 and 68 in FIG. 8 are mounted by cantilevered integrally molded pen arms 88 and 90 extending from a mounting point on pen carriages 74. The elastic cantilever pen arms 88 and 90 differ only in the geometric configurations of the arms to provide for the paired pens. In general, the arms are stressed slightly upwardly as pens 66 and 68 are engaged by writing surface 92.

Figure 9:
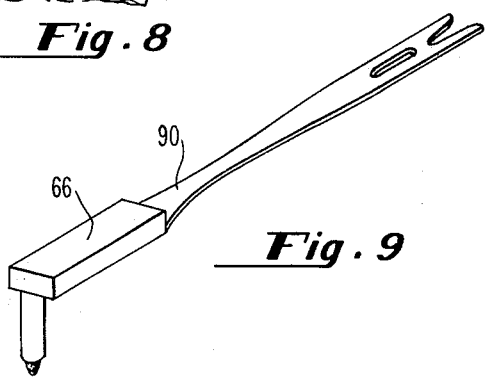
FIG. 9 is a perspective view of a pen with a cantilever spring member integrally formed for mounting the pen and providing the biasing means for the pen.

A disposable instrument marker pen, similar to that shown as pen 66 with mounting arm 90 in FIG. 8 is seen in perspective view in FIG. 9. Such a pen is also particularly adapted for mounting in circular chart systems.

Figure 10:
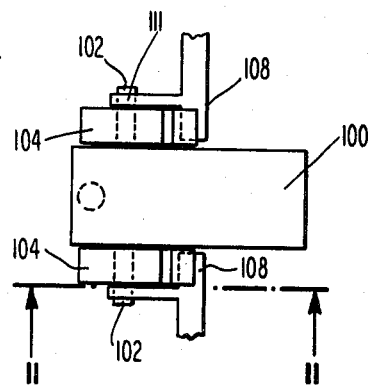
FIGS. 10 and 11 are top and side views respectively of a disposable instrument marker pen with side mounting spring members integrally formed with pen.
Figure 11:
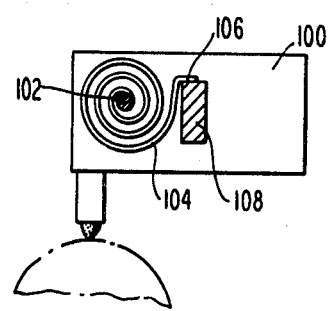

Another embodiment of a disposable instrument marker pen with integrally mounted elastic members for biasing or urging the pen nib into engagement with the writing surface is shown in FIGS. 10 and 11. Shown more specifically there is a pen 100, the sidewall components of which include outwardly extending pivot shafts 102 and helical springs 104 molded thereon with ends 106 adapted to engage a pen carriage support member 108. Pivot shafts 102 are also adapted to mate with and engage other components of the pen carriage 111, the mating engagement of shaft 102 and end 106 of spring 104 with carriage components 108 and 111 being such to securely position pen 100 in the carriage, of which components 108 and 111 are a part, and the helical spring 104 is thus adapted to be stressed slightly when pen 100 is mounted so as to urge the nib of pen 100 downwardly against an engaged writing surface.

Figure 12:
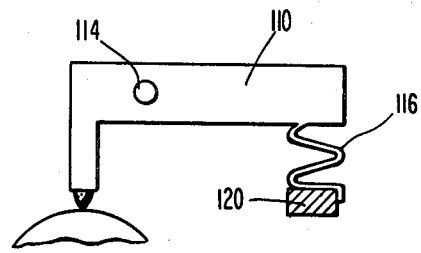
FIG. 12 is a diagrammatic view of an instrument marker pen and a serpentine integrally formed elastic member for urging the pen into engagement with the writing surface.
Figure 13:
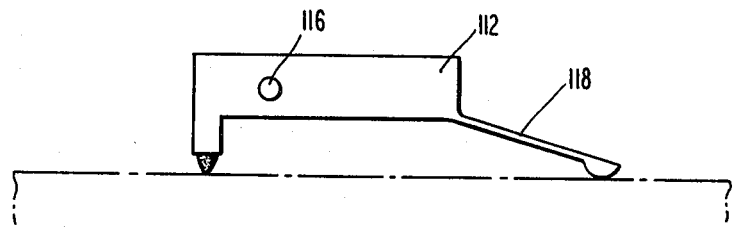
FIG. 13 is a diagrammatic view of a pen similar to that shown in FIG. 12 in which the serpentine elastic member is replaced by an extended leaf support means.

FIGS. 12 and 13 diagrammatically illustrate still other embodiments of the present invention, in which markers 110 and 112 respectively are urged about pivot points 114 and 116 by an integrally molded plastic serpentine spring 116 and a partially cantilevered elastic support member 118, respectively. These springs and support members bear against the component 120 of the pen carriage, in the case of pen of FIG. 12 and against the writing surface itself, in the pen of FIG. 13. The integrally molded elastic member 118 in the pen of FIG. 13 is similar to mounting arm 90 of pen 66, shown in FIGS. 8 and 9, in that the elastic member 118 is stressed by the mounting or bearing of a distal end (i.e. the end of the support member away from the pen to which it is attached), against a support surface in a manner to provide a biasing force at the proximate or near end of the mounting member to provide the necessary biasing force.

In all embodiments of the present invention, particularly including those shown and described above, a biasing force for positioning and securing a disposable instrument marker pen in a pen carriage and/or for biasing the writing tip of the pen against a writing surface is provided by an integrally formed elastic member. The elastic or spring member provided thus positions and secures the pen, or at least relatively so, within the limits of the springingness or elasticity of the spring member, i.e. some slight movement of the pen may be permitted by the elasticity of the spring member.

Moreover, the positioning or urging of the pen in all cases tends to force the pen into a position which is fixed at least relative to some other mating or mounting surface or member, such as a writing surface or a pen carriage or carriage element.

With respect to the term "integrally formed", this generally entails molding of spring-like elements from the same plastic of which the pen body is molded. In this manner, the pen biasing means is provided in a single operation in the course of the molding of the pen body for maximum simplicity and minimum cost. Various plastic compositions may be used for this purpose so long as they may be readily molded and are reasonably elastic. One common plastic used in pens of this type is polypropylene. Various others may be readily adaptable for use in the molding of the pen bodies of the present invention so as to provide the integrally formed elastic members required for this invention. In addition, the present invention may be used in the design and manufacture of an instrument pen in which is also incorporated an integrally formed pen arm attachment means, such as that disclosed and claimed in U.S. Pat. No. 3,983,569-Hubbard, et al, of common assignment herewith.

While this invention has been described with respect to particular embodiments, it is not limited thereto. Rather, numerous other forms of the invention may be devised by those skilled in the art without departing from the invention's true spirit and scope. The intended claims are intended to be construed to encompass all such embodiments, whether or not specifically disclosed herein, so long as said embodiments are within the true spirit and scope of the invention as disclosed and claimed.

Having described my invention, I claim and desire to secure by Letters Patent the following:

1. Disposable instrument marker pen including a body member which houses an ink reservoir and a writing nib extending from said body member, said body member including an elastic member adapted to maintain said pen in relatively fixed position relative to a member with which said pen is adapted to mate, said elastic member comprising an integrally formed part of said body member.

2. Pen, as recited in claim 1, wherein said mating member is a writing surface and said elastic member is adapted to urge said pen against said writing surface.

3. Pen, as recited in claim 2, wherein said member is elongated and adapted to fasten at its distal end in a pen holder.

4. Pen, as recited in claim 2, including a pivot member, about which said pen is adapted to be pivoted so as to bring a pen tip associated with said pen into engagement with a mating writing surface, said elastic member adapted to press against a mounting member and to urge said pen to rotate about said pivot member and thereby to urge said tip into engagement with said writing surface.

5. Pen, as recited in claim 4, wherein said elastic member is a helical spring member.

6. Pen, as recited in claim 4, having a main pen body, wherein said pivot member and said elastic member consist of a pair of torsion members extending away from said body, the distal ends of said torsion members adapted to be retained in fixed rotational position relative to the axes thereof by mating mounting means therefor.

7. Pen, as recited in claim 6, wherein said ends of said torsion members consist of flat sided geometrical shapes and said mating mounting means consist of slots in a mounting carriage for said pen, said slots adapted to receive said ends in sliding engagement and to prevent rotational movement of said torsion members.

8. Pen, as recited in claim 7, wherein said slots include detents for holding said torsion bar ends in a fixed position along the length of said slots.

9. Pen, as recited in claim 1, wherein said elastic member is adapted to retain said pen in a mounting carriage therefor.

* * * * *